US007212788B2

(12) United States Patent
Weber et al.

(10) Patent No.: US 7,212,788 B2
(45) Date of Patent: May 1, 2007

(54) METHOD AND APPARATUS FOR SIGNAL POWER LOSS REDUCTION IN RF COMMUNICATION SYSTEMS

(75) Inventors: David Weber, Palo Alto, CA (US);
Manolis Terrovitis, Berkeley, CA (US);
David Su, Mountain View, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 478 days.

(21) Appl. No.: 10/217,699

(22) Filed: Aug. 13, 2002

(65) Prior Publication Data

US 2004/0033787 A1    Feb. 19, 2004

(51) Int. Cl.
*H04B 1/44* (2006.01)

(52) U.S. Cl. ........................ 455/78; 455/82; 455/83; 455/74

(58) Field of Classification Search ............... 455/3.01, 455/11.1, 422, 101, 132, 66, 86, 82, 562.1, 455/227.1, 227.2; 375/344; 370/280
See application file for complete search history.

(56) References Cited

U.S. PATENT DOCUMENTS

| | | | | |
|---|---|---|---|---|
| 5,276,915 A | * | 1/1994 | Marko et al. | 455/86 |
| 5,991,344 A | * | 11/1999 | Fujii et al. | 375/344 |
| 6,088,570 A | * | 7/2000 | Komara et al. | 455/11.1 |
| 6,108,526 A | * | 8/2000 | van der Plas | 455/78 |
| 6,163,681 A | * | 12/2000 | Wright et al. | 455/66.1 |
| 6,226,508 B1 | * | 5/2001 | Takahashi et al. | 455/277.1 |
| 6,477,148 B1 | * | 11/2002 | Gardenfors et al. | 370/280 |
| 6,751,470 B1 | * | 6/2004 | Ella et al. | 455/552.1 |
| 7,110,381 B1 | * | 9/2006 | O'Sullivan et al. | 370/338 |
| 7,113,748 B2 | * | 9/2006 | Shapira et al. | 455/63.4 |
| 2001/0051512 A1 | * | 12/2001 | Wilson et al. | 455/132 |
| 2002/0055345 A1 | * | 5/2002 | Wood, Jr. | 455/277.1 |
| 2003/0050032 A1 | * | 3/2003 | Masaki | 455/272 |
| 2003/0073916 A1 | * | 4/2003 | Yonce | 600/509 |
| 2003/0134601 A1 | * | 7/2003 | Jou | 455/82 |
| 2003/0207668 A1 | * | 11/2003 | McFarland et al. | 455/3.01 |
| 2004/0204105 A1 | * | 10/2004 | Liang et al. | 455/562.1 |
| 2005/0085267 A1 | * | 4/2005 | Lemson et al. | 455/562.1 |

FOREIGN PATENT DOCUMENTS

JP            000509492 A1 *  4/1992

* cited by examiner

*Primary Examiner*—Matthew D. Anderson
*Assistant Examiner*—Tan Trinh
(74) *Attorney, Agent, or Firm*—Bever, Hoffman & Harms, LLP; Jeanette S. Harms

(57) ABSTRACT

Multiple power amplifiers in an RF front end are coupled to multiple antennas without diversity switching between the PAs and antennas. Diversity switches direct signals to broadcast by a selected antenna to a PA coupled to the selected antenna. Multiple LNAs are similarly coupled to the diverse antennas. Having one PA and LNA set for each antenna removes the need for diversity switching between the PA/LNAs and each antenna improving signal reception. In one embodiment, a single external PA performs broadcast functions and plural on-chip LNAs are used for reception. In another embodiment, phase shifters are coupled to each PA and LNA, which provide beam forming capability for broadcasts, and in phase signal combinations for received signals.

33 Claims, 18 Drawing Sheets $S_1, S_2, S_3, S_4$: logic signals

METHOD AND APPARATUS FOR SIGNAL POWER LOSS REDUCTION IN RF COMMUNICATION SYSTEMS

BACKGROUND OF THE INVENTION

1. Field of Invention

The present invention relates to reduction of signal power loss in communications systems. The invention is more particularly related to the reduction of signal power loss in wireless RF systems. In addition, the invention relates to implementing antenna diversity in wireless systems.

2. Discussion of Background

The use of multiple antennas has become a popular method of improving performance of wireless devices. A simple technique is called "switch diversity", where a radio can alternatively transmit and receive through separate antennas, using only one antenna at a time. The radio can then decide which antenna to use based upon the success of previous communications. FIG. 1 is a diagram of a traditional "switch diversity" architecture. A pair of antennas, Antenna A and Antenna B (diversity antennas 100) are located at diverse physical locations and/or are antennas having diverse physical properties (gain, directivity, etc.). The diversity antennas 100 are connected to a diversity switch 110 that connects the antennas to a transmit receive switch 120. When transmitting, RF Mixers/Baseband device 140 feeds a signal to a power amplifier 132 in RF front end 130. The transmit receive switch 120 directs the amplified signal to the diversity switch 110 which directs the amplified transmit signal to a selected one of the diversity antennas. When receiving a reverse signal flow occurs, except that the received signal is boosted by an LNA 134 prior to being received by the Mixers/Baseband device 140.

The diversity switch 110 is controlled by software or other electronics that selects one of the diversity antennas for reception/transmission. Selection criteria is typically based on quality of signal, S/N ratio, and/or other identifiers, such as packet reception errors, etc. For example, a typical arrangement would call for the baseband and mixers 140 to include some processing or algorithm which activate a control signal to perform the switching. The processing would include receiving packets on each of the antennas for a length of time (or number of packets), and then compare the number of packet errors received by each of the antennas. The antenna with the least number of errors or the highest S/N ratio is then selected for broadcast/reception. Once an antenna is selected, transmission/reception continues on the selected antenna. Periodically, the other antenna(s) are re-tested. In the event a re-test indicates an environment change or other factor is degrading performance of the selected antenna compared to the other antenna(s), the selected antenna is changed to the then best performing antenna.

SUMMARY OF THE INVENTION

The present inventors have realized various inefficiencies, particularly signal losses, that occur through standard diversity and transmit/receive architectures. The present inventors have developed certain improvements in wireless signal reception, particularly when applied to antenna diversity architectures, and transmit/receive architectures. One problem recognized is the loss incurred through the diversity and transmit/receive switches. The switches attenuate the RF signal and introduce noise, which degrades the performance of the PA and LNA when measured from the antenna port.

The present invention provides an architecture, method, and device wherein redundancies at the front end of an RF device can reduce losses that occur at the diversity switch. In highly integrated radio systems, silicon area is inexpensive and the cost of redundancy is low. The losses incurred by the diversity switches can be reduced by duplicating the number of PAs/LNAs as well as moving the antenna diversity switches from between the PA/LNA and antenna to after the PAs/LNAs.

In one embodiment the present invention is an RF front end, comprising, at least one power amplifier configured to transmit signals to at least two antenna ports, and at least two LNA devices, each LNA device configured to receive signals from one of the antenna ports. The invention may also be embodied in an RF device, comprising, at least two antenna ports, an RF front end having at least two PA amplifiers, each PA amplifier having an output coupled to one of the antenna ports, an RF signal generating device, and an antenna diversity switch coupled to the RF signal generating device and the RF front end, wherein said antenna diversity switch is configured to direct RF signals generated by the RF signal generating device to one of the PA amplifiers.

The present invention may also be embodied as a method of transmitting RF signals, comprising the steps of, preparing an RF signal for transmission, selecting an antenna best suited for transmitting the prepared RF signals from a set of at least two antennas, and feeding the prepared RF signals to a power amplifier coupled to the selected antenna; and/or a method of receiving RF signals, comprising the steps of, determining at least one antenna best suited for receiving RF signals, and switching a signal receiving line to an output of an LNA coupled to one of the best suited antennas.

Portions of both the device and method may be conveniently implemented in programming, data sequences, and/or control signals executed or generated on a general purpose computer. Any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
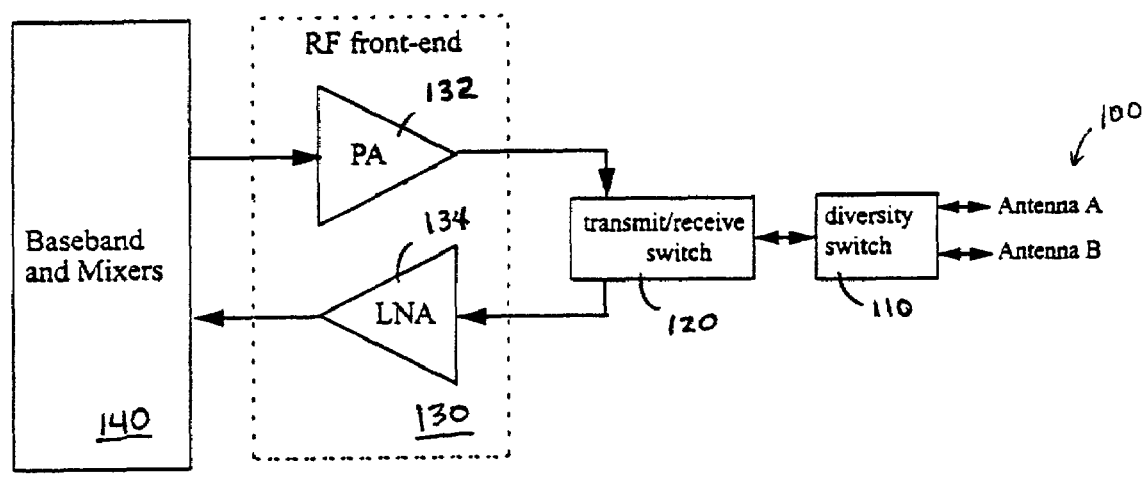
FIG. 1 is a block diagram of a traditional switch diversity antenna architecture.
Figure 2:
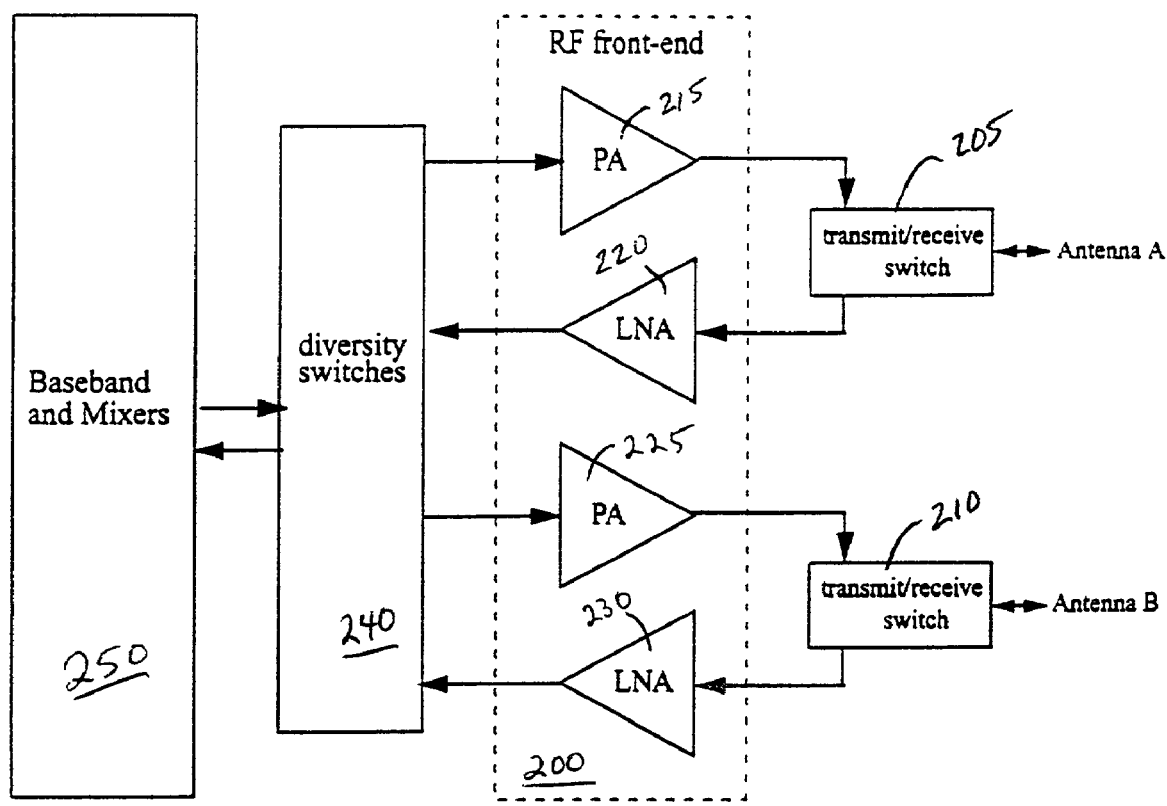
FIG. 2 is a block diagram of a redundant front end architecture in a diversity antenna device according to an embodiment of the present invention.

Referring again to the drawings, wherein like reference numerals designate identical or corresponding parts, and more particularly to FIG. 2 thereof, there is illustrated a block diagram of diversity antenna according to an embodiment of the present invention. The illustrated embodiment provides a framework from which signal losses incurred due to a diversity switch can be reduced.

The signal affected most by inefficiencies, and therefore presenting the greatest design challenge is the signal as it is transmitted to and received from the antenna. The signal is received, for example, at antenna A, and is then directed, by transmit/receive switch 205, to the LNA 220. In the previous designs, a diversity switch was also included in the signal path from the antennas to the LNA. However, in the invention, RF front end 200 has an architecture that uses redundant front end components that eliminates the need for a diversity switch between the front end and the antennas.

In FIG. 2, the baseband and mixers provide a signal to be transmitted. The signal to be transmitted is amplified as required to counteract any losses that occur at a diversity switch 240. The diversity switch 240 sends the signals to be transmitted to one of a first PA 215 and a second PA 225. The diversity switch 240 is set to send the signal to be transmitted to PA 215 when Antenna A is the selected antenna for transmissions. Reversing that process, when receiving signals, and antenna A is the selected receiving antenna, signals received at antenna A are routed through LNA 220, where they are amplified, and then sent through diversity switch 240 to the baseband and mixers 250. When the selected antenna is antenna B, similar processes occur except that the transmit signals are routed through PA 225 and received signals are routed through LNA 230.

Therefore, redundant architecture of RF front-end 200 implements a switch diversity scheme without the need for a diversity switch between the RF front-end and the antennas, improving the system performance. The diversity switching function is accomplished in a less performance critical section of the radio. Additional power usage is averted because the unused half of the RF front-end can be powered down (i.e., when transmitting/receiving on antenna A, PA 225 and LNA 230 are powered down).

If the PA and LNA are integrated parts of a larger radio-on-a-chip, the incremental cost of the silicon area to duplicate the PA and LNA layouts is relatively small. The primary cost of this approach is the need to multiply the number of package pins required for the PA and LNA ports by the number of diversity antennas being implemented. The transmit/receive switches 205 and 210 can either be integrated or off-chip.

This architecture could also be used with discrete components for the PAs and LNAs, but the cost of discrete components could be prohibitive because of the need to buy multiple PA and LNA components. If discrete external components are necessary due to performance constraints, a modified version of the redundant diversity architecture allows for the use of a single external component.

Figure 3:
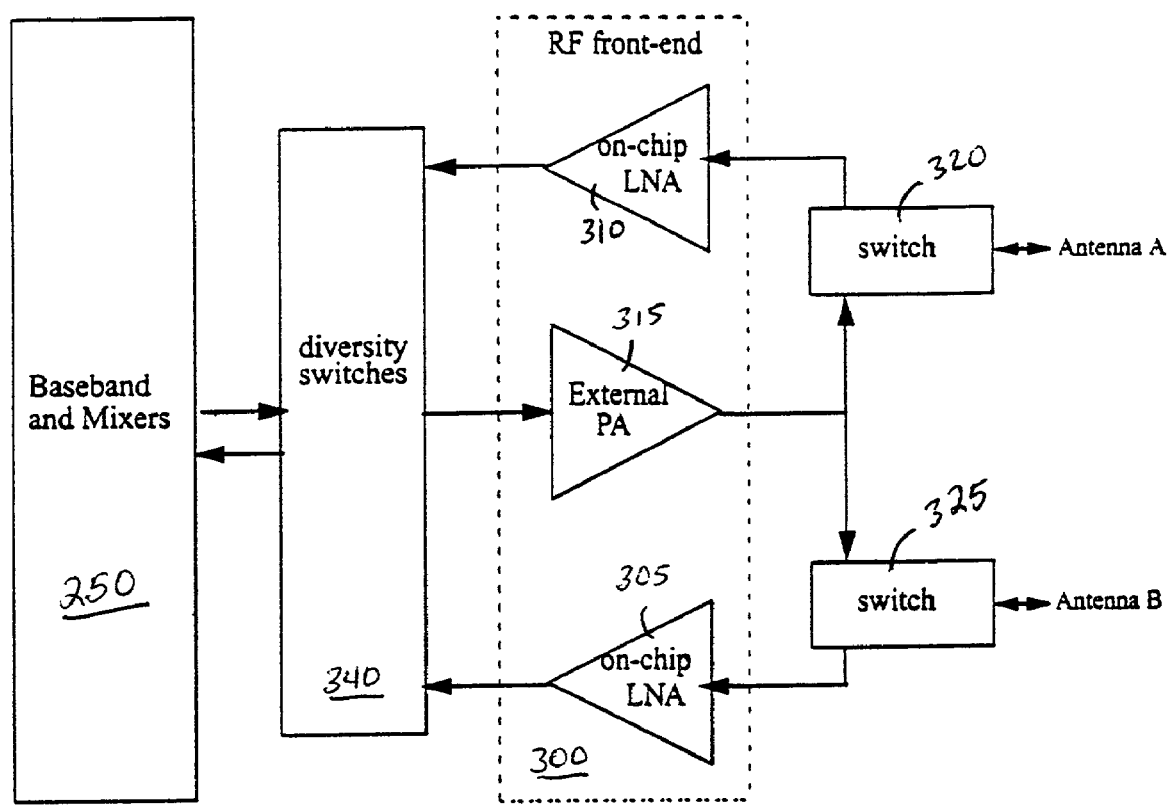
FIG. 3 is a block diagram of a half redundant front end in a diversity antenna device according to an embodiment of the present invention.

FIG. 3 is a block diagram of a half redundant front end 300 in a diversity antenna device according to an embodiment of the present invention. The half redundant front end 300 is attached to diversity switches 340. The diversity switches 340 direct incoming signals from either LNA 305 or LNA 310, each on-chip devices, to the baseband and mixers 250. Signal to be transmitted, from the baseband and mixers 250 are routed to an external Power Amplifier (PA) 315. The external PA then powers one of the antennas according to setting of switches 320 and 325.

The half-redundant architecture of RF front-end 300 duplicates the layout of the on-chip components, mainly the LNA, where the incremental cost is small, while avoiding the cost of duplicating external components. In the example above, an external PA and a redundant LNA is used, but a similar architecture with a redundant PA and an external LNA could be used.

Using the half-redundant architecture, the performance of the external component may be compromised because of having to drive two switches (e.g., switches 320 and 325). The finite isolation of the switch that is off will allow some fraction of power to be diverted from the intended path. However, the use of an external component may provide enough power margin to overcome this loss. In the example above, the performance of the external PA may be compromised, but the loss from the antenna to the LNAs is still lower than a traditional architecture with a diversity switch between the RF front-end and the antennas.

In another embodiment, multiple LNA and/or PA devices are implemented on-chip, one dedicated to each antenna. More than one of these devices can operate at a given time, enabling the simultaneous use of multiple antennas, or equivalently the use of one multi-element antenna.

Figure 4:
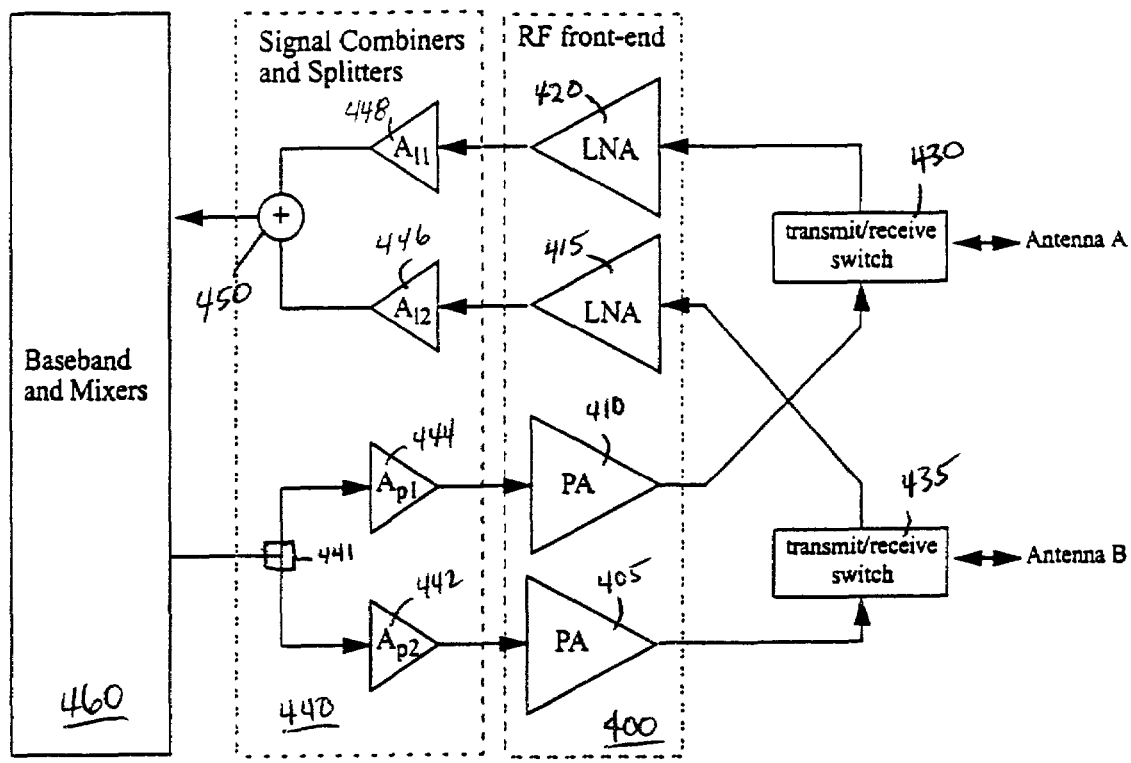
FIG. 4 is a block diagram of a beam forming architecture using multiple integrated PA and LNA blocks according to an embodiment of the present invention.

FIG. 4 is a block diagram of a beam forming architecture using multiple integrated PA and LNA blocks according to an embodiment of the present invention. RF front end 400 includes a power amplifier (PA) (e.g., PAs 405 and 410) and an LNA (e.g., LNAs 415 and 420) for each antenna. Although the figures presented herein mainly show two antennas, any number of antennas may be utilized. In the beam forming embodiment, for example, three, four, or more antennas may be utilized, each antenna having an additional set of LNA and PA that is preferably on-chip.

Each PA is shown feeding a transmit receive switch and a corresponding antenna. For example, PA 410 feeds transmit/receive switch 430 and antenna A, and PA 405 feeds transmit/receive switch 435 and antenna B.

An input signal to be transmitted (from baseband and mixers 460) is split to feed each of the PAs. In a component based implementation a splitter 441 is utilized to split the signal in an integrated implementation a shared line may be utilized.

One of the PAs (e.g., 405/410) is operational when the device is being operated in the single antenna mode, and both PAs are operational when transmitting in a beam forming or multiple antenna mode. Again, other PAs and corresponding antennas may be utilized and included in the beam forming or multi antenna element modes, or any one or more of the PAs and corresponding antennas may be shut down when the corresponding antenna is either being used for receiving or not utilized. Any number of combinations of transmitting, receiving, and/or unutilized PA and antenna combinations is possible to match any system requirements.

Each LNA is fed a received signal from one of the antennas, through a corresponding transmit/receive switch. Outputs of the LNAs are combined (at adder 450) when the device is in a multi antenna element configuration. Any one or more LNA outputs may be excluded from the adder operation if that LNA/antenna are idle, or, when that LNA/antenna are being used in a transmit capacity.

Thus, in the embodiment of FIG. 4, the on-chip diversity switches discussed previously are replaced by appropriate signal combiners (e.g., adder 450) at the outputs of the LNAs and signal splitters which provide the inputs to the PAs. The properties and advantages of multi-element antennas are well documented in literature. By adjusting the phase with which the signals are combined from or split between the multiple antennas, the radiation diagram of the antennas (beam forming) can be adjusted and significantly improve the antenna gain towards the desired direction, with respect with what is achieved with a single antenna. The adjustment may be made by trial and error or based on an algorithm that tries different phase adjustments and extrapolates the results of the different phase adjustments to a best phase from which to combine the signals with. FIG. 4 provides a preferred configuration. Blocks $A_{/1}$, $A_{/2}$, $A_{p1}$, $A_{p2}$ (442–448) are programmable phase shifters. Using appropriate circuit techniques, these blocks can be implemented in a way that does not incur an appreciable cost in terms of performance degradation, power consumption, or silicon area. The implementation is facilitated if the phase shifters are capable to implement only a finite set of signal phase rotation (for example, 0°, 180°, and 90°) as opposed to implementing an arbitrary signal phase rotation which is also realizable. The finite number of phase rotations reduces performance with respect to an arbitrary phase rotation, but by only a small amount and reduces complexity and cost. The use of multiple LNAs and PAs does come at the price of increased power consumption, but it is possible that lower performance and lower power circuit blocks can be used and still benefit from the new architecture. Because the performance improvement provided by this technique might be enough to eliminate an external LNA or PA, this technique can be used to provide significant system power and form factor reduction.

To illustrate the benefit of this configuration in an integrated receiver consider, for example, that the signal is being received with the same power from the two antennas and its phase is adjusted in the blocks $A_{/1}$ and $A_{/2}$ such that the two signals add in phase. The signal level is then 6 dB higher than in the case that a single antenna is used. The noise received by the two antennas and introduced by the transmit/receive switches and all the circuitry in front of the combiners is uncorrelated in the two paths and the output of the combiner has 3 dB higher noise level than the LNA output in the single antenna case. Therefore, the SNR improvement is 3 dB. In addition, since the signal level is higher at the combiner output than in the single active LNA case, the noise contribution of the rest of the receiver chain (mixers and baseband) is lower.

On the transmitter side, consider an example where the two PAs are fed with equal amplitude signals, shifted in phase appropriately by blocks $A_{p1}$, and $A_{p2}$ such that the outputs of the two antennas add constructively in phase at the desired direction. Then the transmitted signal is 6 dB higher than in the single antenna case assuming that the input signal to the single PA is equal to the signal to each one of the multiple PAs. Since the amount of transmitted power at the desired direction is usually defined by the system requirements, we can reduce the signal power fed to each PA, with a significant linearity benefit with respect to the single PA case. Since each PA needs to transmit only the fourth of the power of the single PA case, the power consumption in the two PAs can be significantly lower than twice the power consumption in the single PA case.

As stated before, the on-chip diversity switches, as well as the signal combiners and splitters can be implemented on-chip in various efficient ways.

Figure 5:
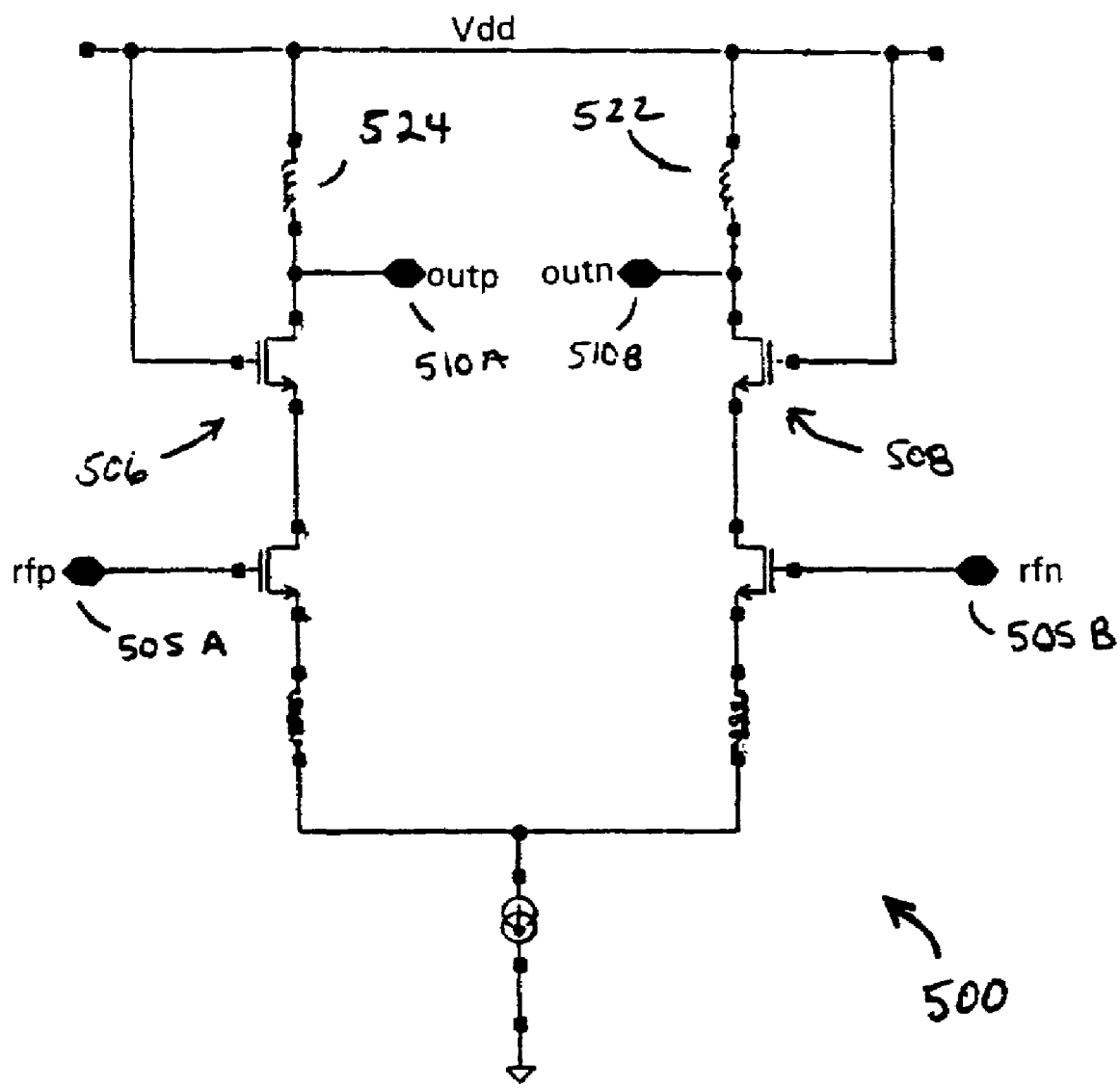
FIG. 5 is a circuit diagram of a conventional implementation of an on-chip LNA.

FIG. 5 is a circuit diagram of a conventional implementation of an on-chip LNA. LNA 500 includes Cascode devices (e.g., 506/508) provide for reverse isolation and stability. The dual outputs 510A/510B, and dual inputs 505A and 505B indicate a differential design. Bias and other details are omitted to enhance clarity. As with all the circuit diagrams presented herein, values of specific components shown, if any, are merely exemplary.

Figure 6:
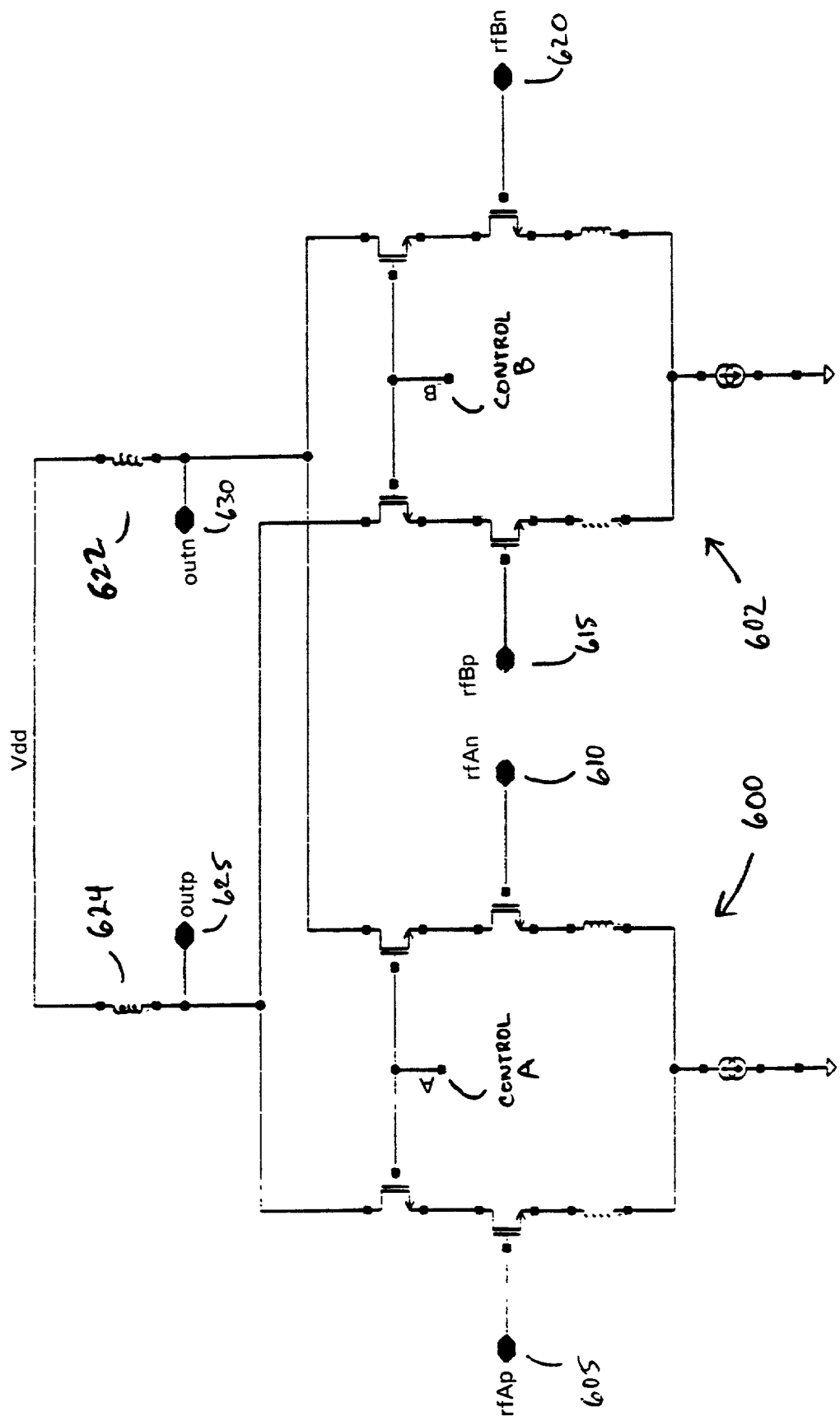
FIG. 6 is a circuit diagram of an example implementation of an on-chip LNA having switching pairs for steering current according to an embodiment of the present invention.

Diversity, as discussed with reference to FIGS. 2 and 3, can be achieved by using two of the LNAs described in FIG. 5 (or another LNA design) with a common pair of load inductors (e.g., 622/624—which are used for tuning the frequency to which the device is sensitive) as shown in FIG. 6. The gate voltages of the cascode devices can be controlled by logic signals control A and control B to turn off the LNA that needs to be disconnected (e.g., LNA 600 or LNA 602). For example, if LNA 600 was to be used, then Control B would be grounded, and the four transistors on the right, that constitute LNA 602, would effectively be eliminated. Preferably, LNA 600 is connected to a first antenna, and LNA 602 is connected to a second antenna. And, with the redundant amplifiers, the antennas are more directly connected to the amplifiers.

An implementation consistent with diversity as implemented in FIG. 6 has an additional advantage in that much less physical space is taken up than a design that simply made redundant LNAs. In the redundant LNA design of FIG. 5, the inductors (e.g., 522/524) take up more physical space than other parts of the circuit, therefore the redundant LNA uses more die space and has greater manufacturing cost. Since the inductors take up a large percentage of space even for a single LNA, a design consistent with FIG. 6 can be implemented on a die space nearly equivalent to the die space of a single LNA, but it is a dual LNA implementation.

Figure 7:
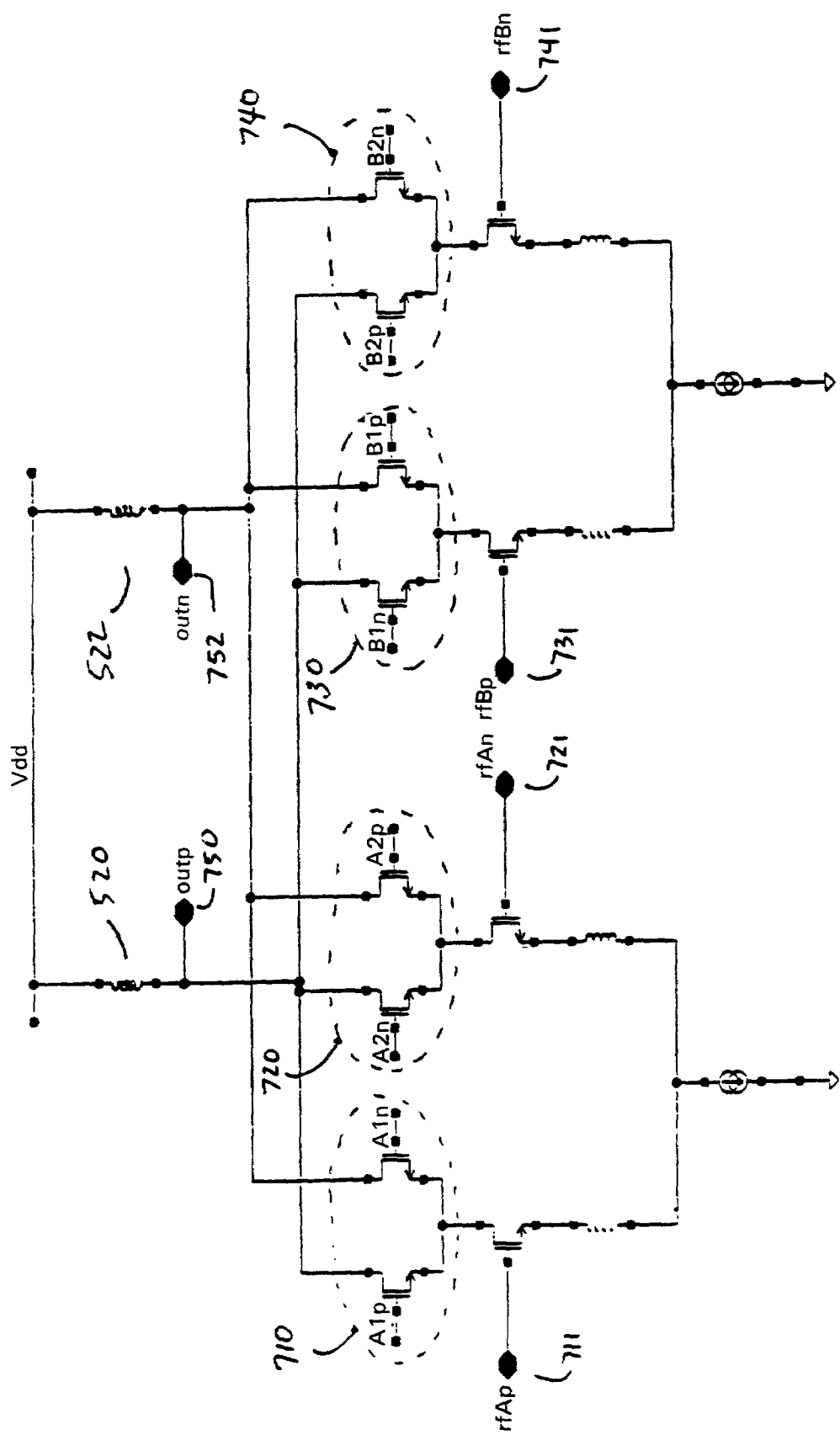
FIG. 7 is a circuit diagram of an example implementation of an on-chip amplifier that enables beam-forming according to an embodiment of the present invention.

FIG. 7 is a circuit diagram of an example implementation of an on-chip amplifier that enables beam-forming. The amplifier may be, for example, an LNA or a PA pre-driver. As illustrated in FIG. 7, diversity as well as beam forming, as discussed with reference to FIG. 4, can be implemented by replacing the cascode devices with switching pairs (e.g. switching pairs 710, 720, 730, and 740) which can steer the current to the one or the other load inductor. By controlling the gates of the transistors of the switching pairs with logic signals (A1p, A1n, A2n, A2p, B1n, B1p, B1p, B1n) we can obtain the signal from either antenna A or antenna B alone, the sum of antenna A and antenna B, or the difference between antenna A and antenna B. By adding additional circuits, these properties may be propagated to triple, quad, or more antenna arrays.

For example, the current-steering amplifier topology of FIG. 7 can be used either as an LNA or as a PA driver, depending on how the inputs 711, 721, 731, and 741 and outputs 750 and 752 are connected. Control Logic signals are attached to gates on switching pairs 710, 720, 730, and 740 (A1p, A1n, A2n, A2p, B1n, B1p, B1p, B1n). For LNA: antennas are attached to gates at inputs 711, 721, 731, and 741; and receive mixers are connected to outputs 750 and 752. For PA driver: transmit mixers are attached to gates at inputs 711, 721, 731, and 741; and antennas are attached to outputs 750 and 752.

A notable variation between FIG. 6 and FIG. 7 is that FIG. 6 provides two control (logic) signals so that either amplifier A (e.g., 600) is on or amplifier B (e.g., 602) is on. In FIG. 7, the switching pairs allow a summing operation. By manipulating the logic signals, the amplifiers may be configured only antenna A, only antenna B, A+B, or A−B. Now, since the antennas are to be located in different places, radiation patterns having peaks and valleys are formed (e.g., see FIG. 9). Depending on where a signal that a radio is trying to listen to, or, in the case of a transmitter, where a transmitter is trying to transmit to, there will be an optimum combination that provides the best communications link.

For example, in terms of receiver, depending on where the transmitting station is, the receiver may get the clearest reception by subtracting the two signals received from the different antennas, or by adding them. In one embodiment, the present invention includes a processing device that tries different combinations of A, B, A+B, A−B, etc., and then determines which combination/single antenna gives the best reception, and then that combination is used for the remaining transmission. In one embodiment, the selected antenna combination is periodically updated.

The penalty introduced by the implementation of FIG. 7 is the small gain reduction of each LNA with respect to the single antenna implementation, because of the parasitic capacitance introduced by all the cascode devices and the lower load inductor value required to resonate it. However, the benefits are considerable and, in most applications, easily justify this small gain reduction In one embodiment, not shown in FIG. 7, to mitigate the gain reduction penalty, the switching pairs of one of the two LNAs are replaced with single cascode devices, since it suffices to be able to change the sign of the signal of one of the two LNAs only. Some asymmetry between the two paths may be introduced, but that disadvantage may be outweighed by the mitigating effects.

Figure 8:
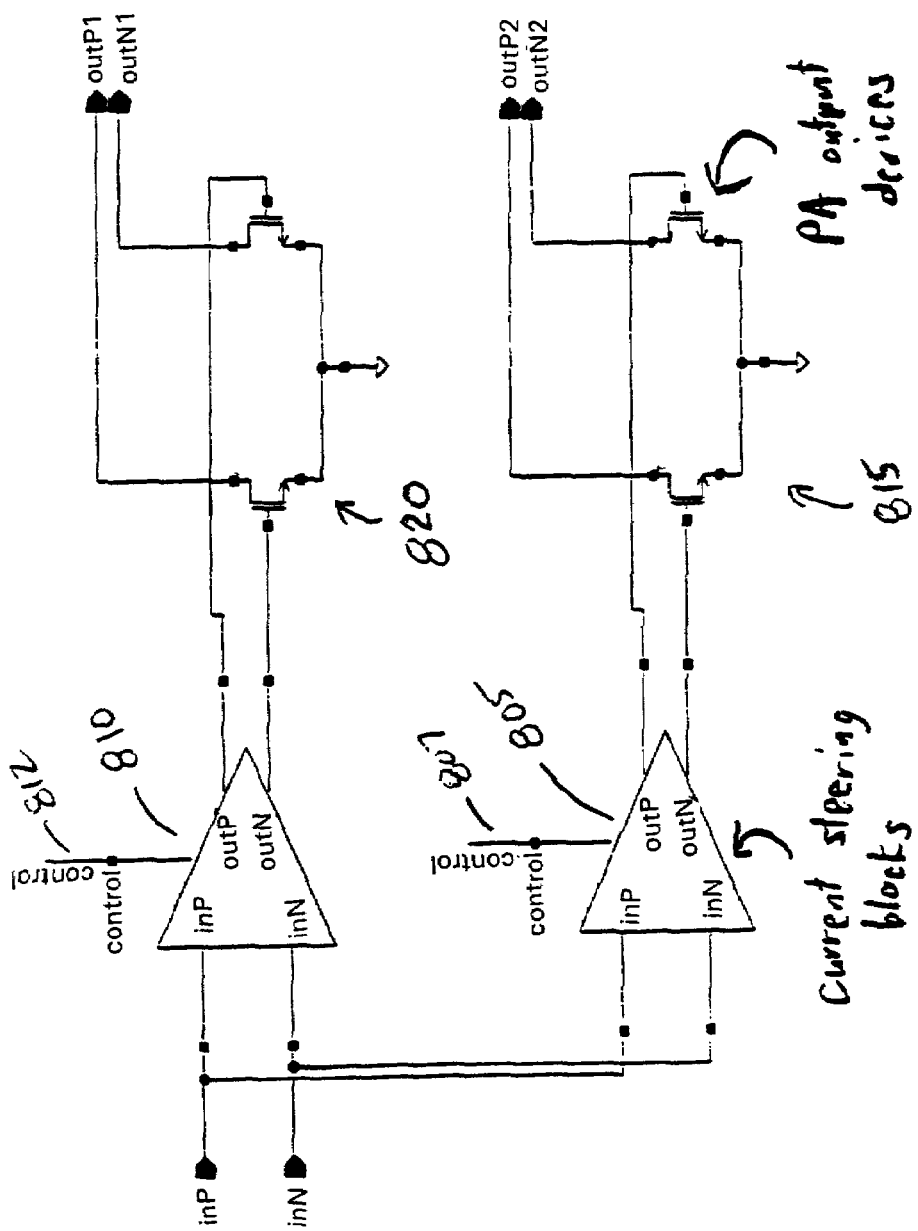
FIG. 8 is a circuit diagram of an example implementation of a beam-forming PA according to an embodiment of the present invention.

An implementation of a redundant PA to implement switch diversity would be to duplicate the PA layout, drive the PAs in parallel, and power down the amplifier driving the unused antenna. Implementing beam steering requires more complexity compared to the LNA case, as current steering devices in the output stage would reduce the amount of voltage that can be delivered to the antenna which in turn would reduce the PA efficiency. FIG. 8 proposes an alternate transmitter implementation where two sets of current steering drivers (similar to FIG. 7) 805 and 810 are used to drive two output stages 815 and 820. The control bits (807 and 812) to the drivers direct the TX signal paths to be driven in phase or complementary, or alternatively, the control bits can power down one PA or the other.

Figure 9:
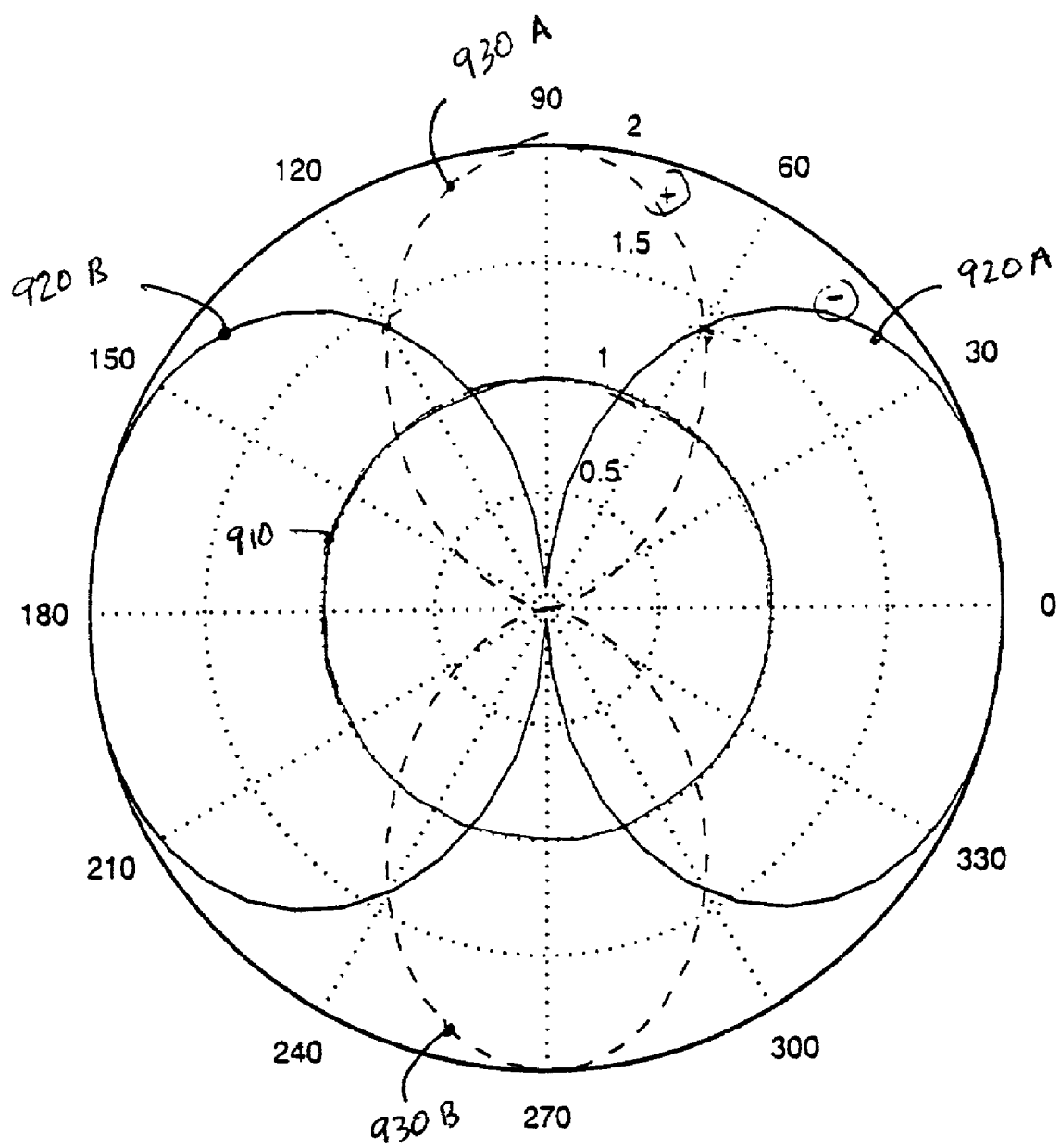
FIG. 9 is a graph of example antenna radiation patterns resulting from the circuit of FIG. 8.

FIG. 9 is a graph of example antenna radiation patterns resulting from the circuit of FIG. 8. In FIG. 9, the radiation pattern is shown for a single antenna, pattern 910 (e.g., antenna A or antenna B transmitting alone). The difference of antenna A and antenna B is shown as patterns 920A and 920B, and the sum of antenna A and antenna B is shown as patterns 930A and 930B.

The phase shifting techniques presented above in FIG. 6 and FIG. 7 is configured to shift the signal 0 or 180 degrees. However, referring back to FIG. 4, an implementation with programmable phase shifters can implement additional, or programmable phase shifts of the antenna radiation pattern. Other phase shifting techniques may also be utilized.

Figure 13:
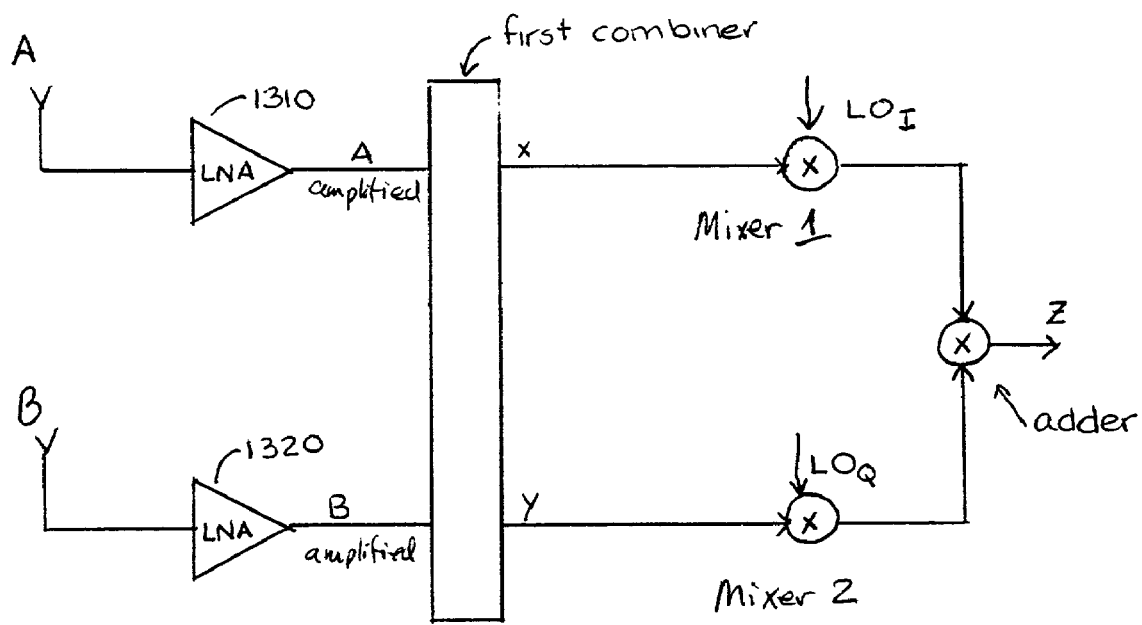
FIG. 13 provides an example implementation of beam forming by signal phase shifting according to an embodiment of the present invention.

For example, the present invention provides a higher degree of phase shift programmability by replicating a larger part of the receive and transmit chains instead of the LNAs and/or PAs only. Phase shift by 90 degrees can be achieved by shifting a Local Oscillator (LO) signal that drives a mixer by 90 degrees. The I and Q components of the LO signal are often available on-chip and are utilized in this manner to implement a signal phase shift by 90 degrees. FIG. 13 provides an example implementation of received signal phase shifting by 0°, 90°, and 180° according to an embodiment of the present invention. Antenna A and antenna B each feed received signals to corresponding LNAs 1310 and 1320. The amplified signals are combined by a first combiner 1330 to produce combined signals x and y, which are described as:

$$(x,y) \in \{(A,0), (B,0), (A+B,0), (-A+B,0), (A,B), (-A,B)\}$$

Therefore, x can be either A, −A, B, A+B, or −A+B, and y can be B or 0. Mixer 1 multiplies x with a signal $LO_I$, (I component of a local oscillator), and mixer 2 multiplies y with a signal $LO_Q$ (Q component of the local oscillator). The $LO_I$, and $LO_Q$ signals are 90° out of phase. Adder 1350 then combines each of the x and y phase shifted signals to a combined phase shifted signal z. The signal z is described as:

$$z \in \{A, B, +/-A+B, +/-A+jB\}, \text{ where } j^2=-1, \text{ and}$$

it is also noted that the signal jB represents the B amplified signal rotated by 90°. Furthermore, in this implementation, it is also noted that Mixer M2 only needs to be powered on when it is desired to obtain z=+/−A+jB because all the other combinations are obtainable via combiner 1330. Although FIG. 13 is directed to receiving signals, the same basic architecture described in FIG. 13 may be applied to a transmit chain where signals are combined and phase shifted prior to broadcast on the antennas.

Figure 14A:
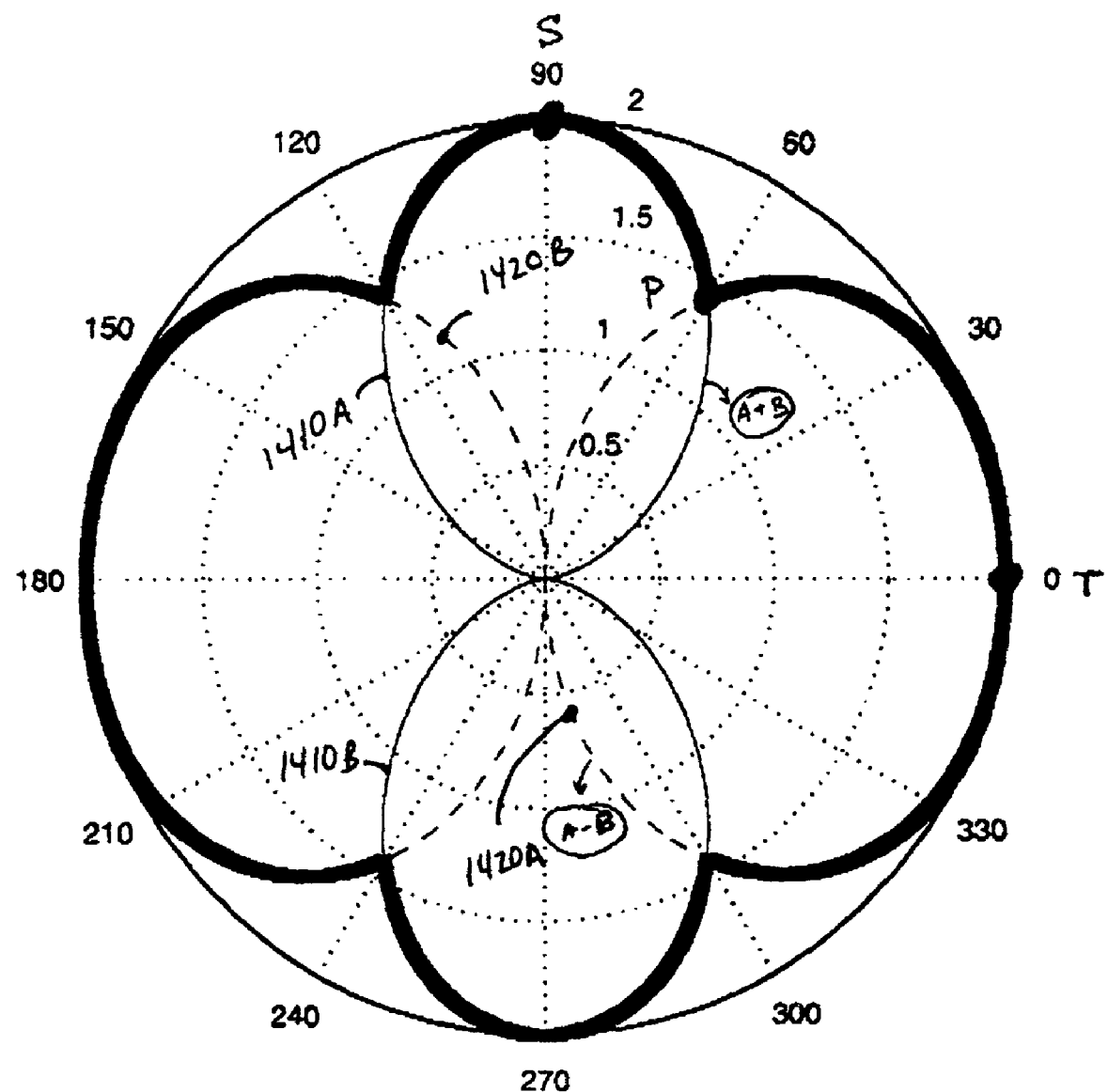
FIG. 14A is a radiation diagram for a pair of antennas configured without the additional mixers shown in FIG. 13.

FIG. 14A is a radiation diagram for a pair of antennas configured without the additional mixers shown in FIG. 13. The radiation diagram is based on assumptions of antenna omnidirectivity and that a distance between antennas A and B is ½ of a wavelength. A pair of lobes 1410 A and 1410 B illustrate radiation patterns of antennas A and B (and, conversely, reception sensitivity when receiving signals) for the case of A+B. Lobes 1420 A and 1420 B illustrate radiation patterns of antennas for the case of A−B. The bold line highlights the outer edges of each of the lobes. The present invention includes programming or other logic that recognizes directivity needed for a signal to be broadcast and directivity strength in received signals. The programming or other logic also selects the most advantageous combination of, +/−A, B, jB, etc., for broadcast or received signals based on that directivity. Therefore, the bold line illustrates the effective radiation pattern of the antenna because the programming and logic allows the best characteristics of each radiation pattern to be taken advantage of.

Figure 14B:
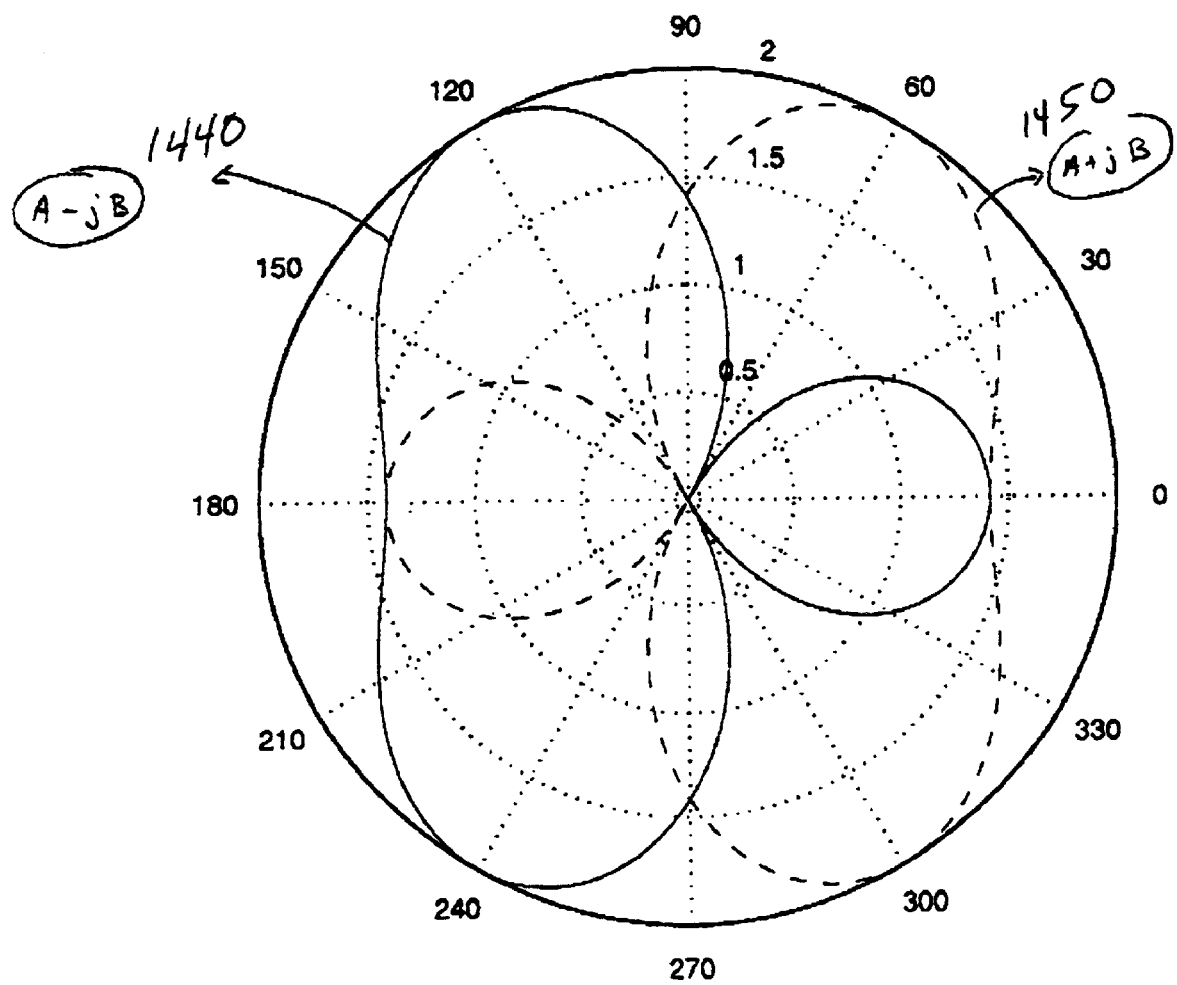
FIG. 14B is a radiation diagram illustrating the jB combinations according to the example implementation of FIG. 13.
Figure 14C:
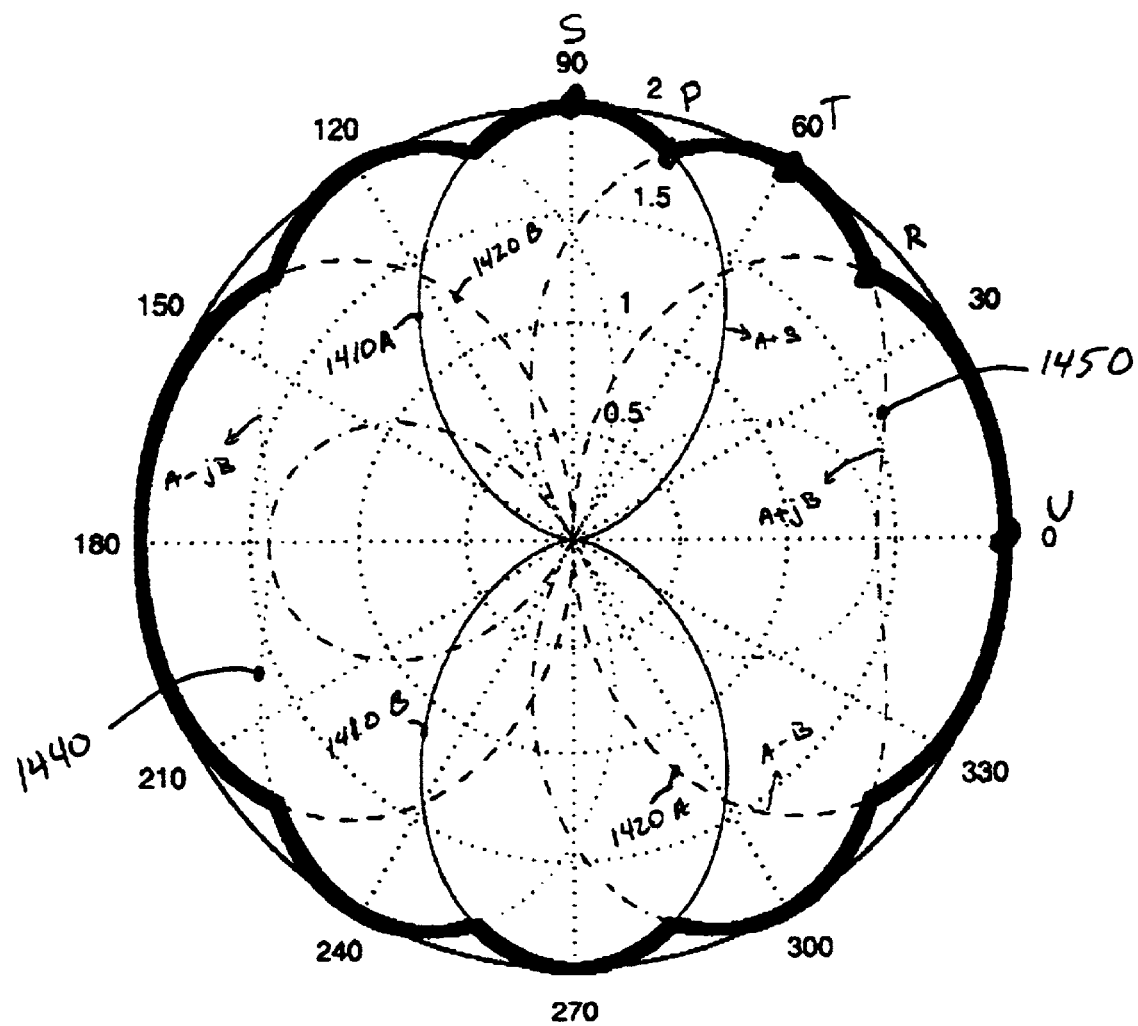
FIG. 14C is an effective radiation diagram combining A+−jb radiation patterns of FIG. 14B with the radiation patterns of FIG. 14A.

By adding more combinations of antenna patterns and including additional programming and or logic to select the additional antenna patterns when needed, the effective radiation pattern of the antennas is further increased. FIG. 14B is a radiation diagram illustrating the jB combinations (B rotated 90°) according to the example implementation of FIG. 13. Lobe 1440 illustrates the A−jB radiation patterns, and lobe 1450 illustrates the A+jB radiation pattern. These additional radiation patterns are added to those illustrated in FIG. 14A, resulting in an effective radiation pattern as shown by the bold line in FIG. 14C.

Figure 15:
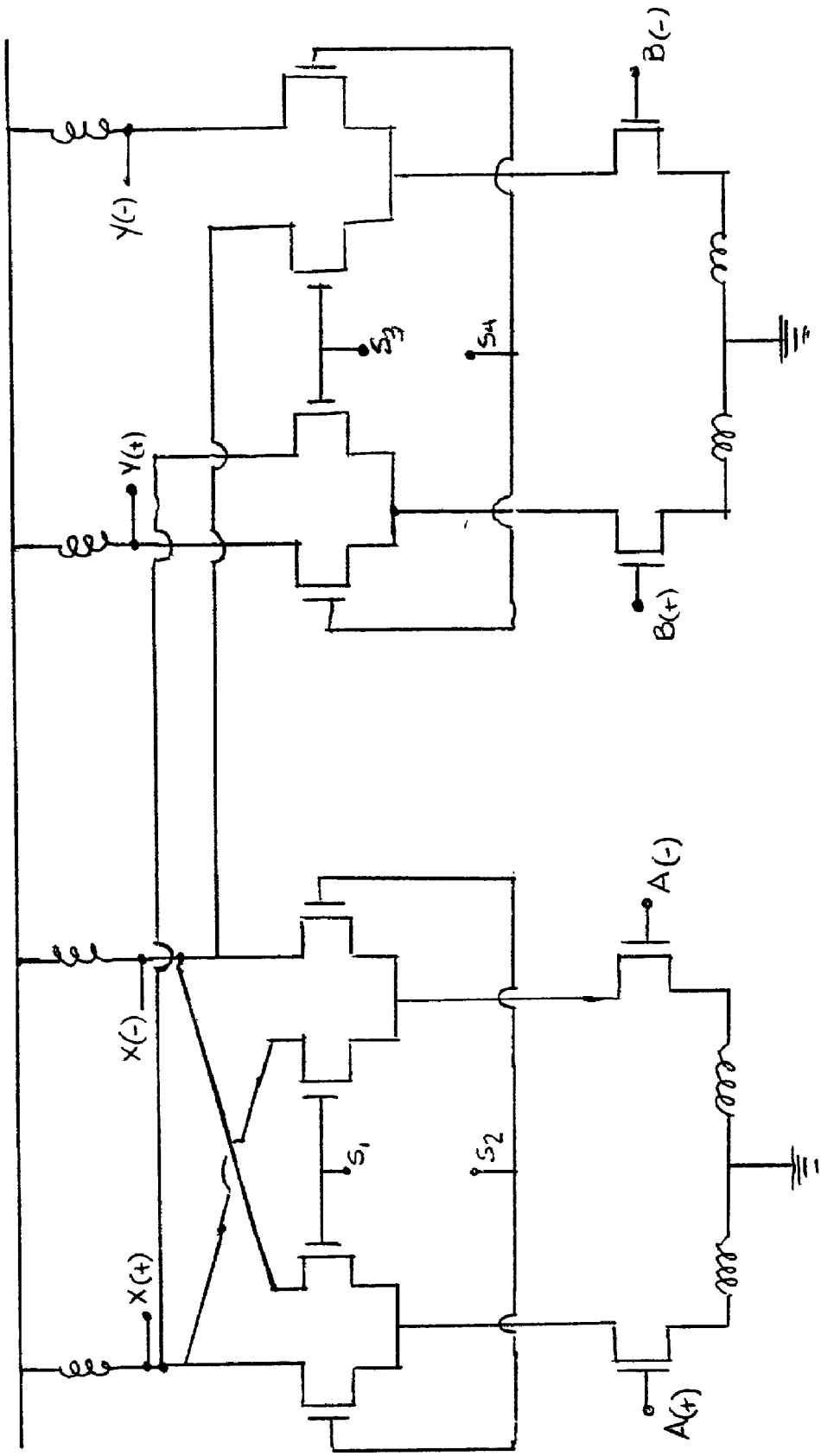
FIG. 15 is an example circuit implementation of the LNAs and 1st combiner from FIG. 13 according to an embodiment of the present invention.

FIG. 15 provides an example circuit implementation of the LNAs and 1st combiner from FIG. 13. Differential amplifier LNA A amplifies signals A(+) and A(−), and LNA B amplifies signals B(+) and B(−). Logic signals S1, S2, S3, and S4 control whether LNA amplified signals A(+), A(−), B(+), or B(−) are applied individually or in combination to differential output signals x(+), x(−), and y(+), y(−). For example, to get an (x, y)=((A−B), 0) from the combiner, logic signals are applied so that $S_1=1$, $S_2=0$, $S_3=1$, and $S_4=0$, therefore, the x differential outputs each have +/−A and −/+B applied to them, resulting in an A−B signal. Table 1 provides a logic chart identifying control signals and outputs for FIG. 15:

TABLE 1

| | $S_1$ | $S_2$ | $S_3$ | $S_4$ | x(+) | x(−) | y(+) | y(+) |
|---|---|---|---|---|---|---|---|---|
| A | 0 | 1 | 0 | 1 | A(+) | A(−) | B(+) | B(−) |
| A − B | 1 | 0 | 1 | 0 | A(−) + B(+) | A(+) + B(−) | 0 | 0 |
| −A | 1 | 0 | 0 | 1 | A(−) | A(+) | B(+) | B(−) |
| A + B | 0 | 1 | 1 | 0 | A(+) + B(+) | A(−) + B(−) | 0 | 0 |
| B | 0 | 0 | 1 | 0 | B(+) | B(−) | 0 | 0 |

Figure 16:
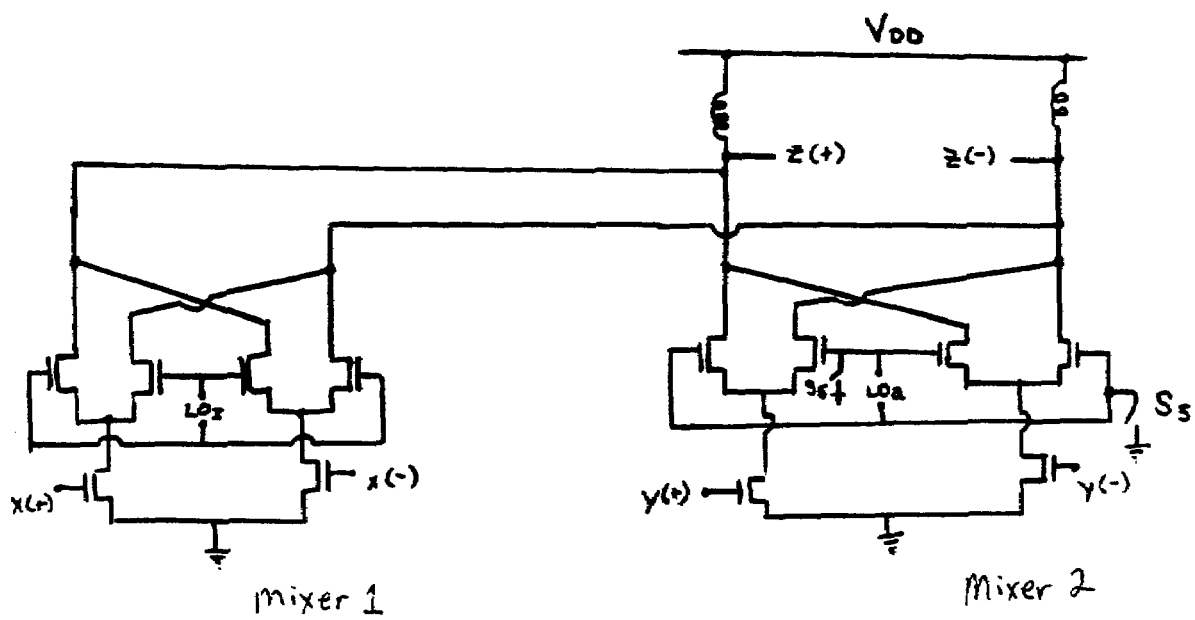
FIG. 16 is a circuit diagram of an example implementation of the mixers M1, M2, and adder of FIG. 13 according to an embodiment of the present invention.

FIG. 16 is a circuit diagram of an example implementation of the mixer 1, mixer 2, and adder of FIG. 13. The topology follows a Gilbert Cell topology, but applied for use in the present invention. Switches $S_5$ and $S_6$ are closed to shut down mixer 2 under the conditions described above.

The present invention also provides an implementation that eliminates off-chip receive/transmit switches. Off-chip diversity and Receive-Transmit switches are usually implemented as series or shunt switches. Switches are often implemented with diodes or FET transistors. Open series switches and closed shunt switches are ideally lossless terminations and can be used to reflect the signal power and direct it to a desired device. The present invention includes the implementation of on-chip series or shunt switches as a way to eliminate the off-chip devices. Such an implementation saves the cost of the external devices, and lowers the system power consumption in the case that the on-chip devices replace external diode switches, since diodes consume DC power when they are on. More significantly, they can potentially reduce the front-end signal power loss.

The on-chip switches, implemented with FET transistors are not ideal. Their on resistance is finite, while the lossy capacitance of the source and the drain represent some finite resistance to the substrate at high frequency. Parasitic series resistance of on switches is less harmful in terms of power loss when the impedance of the block to which the switch is connected in series is high. Parasitic shunt resistance is less harmful when the impedance of the block to which the switch is connected in series or in shunt is low.

The input of the LNA is usually very sensitive to any lossy components connected to the gate of the input device. If a switch isn't used at the LNA input, when powered down, the LNA possibly represents only a small load to the PA, relative to the load represented by the lossy drain region of the large PA output transistors. However, a good on-chip shunt switch at the PA output can be implemented by using the PA output devices, without the need for new switch devices, which will introduce more losses. Therefore, while in concept this invention would require two on-chip shunt switches, in practice only the PA shunt switch may be needed. However, an advantage may still exist when including both the PA and LNA shunt switches in a design. For example, large amounts of power transmitted by the PA may have enough power leakage to the LNA that the LNA may be in danger of being damaged. In this case, the LNA shunt switch would help prevent damage.

Figure 10:
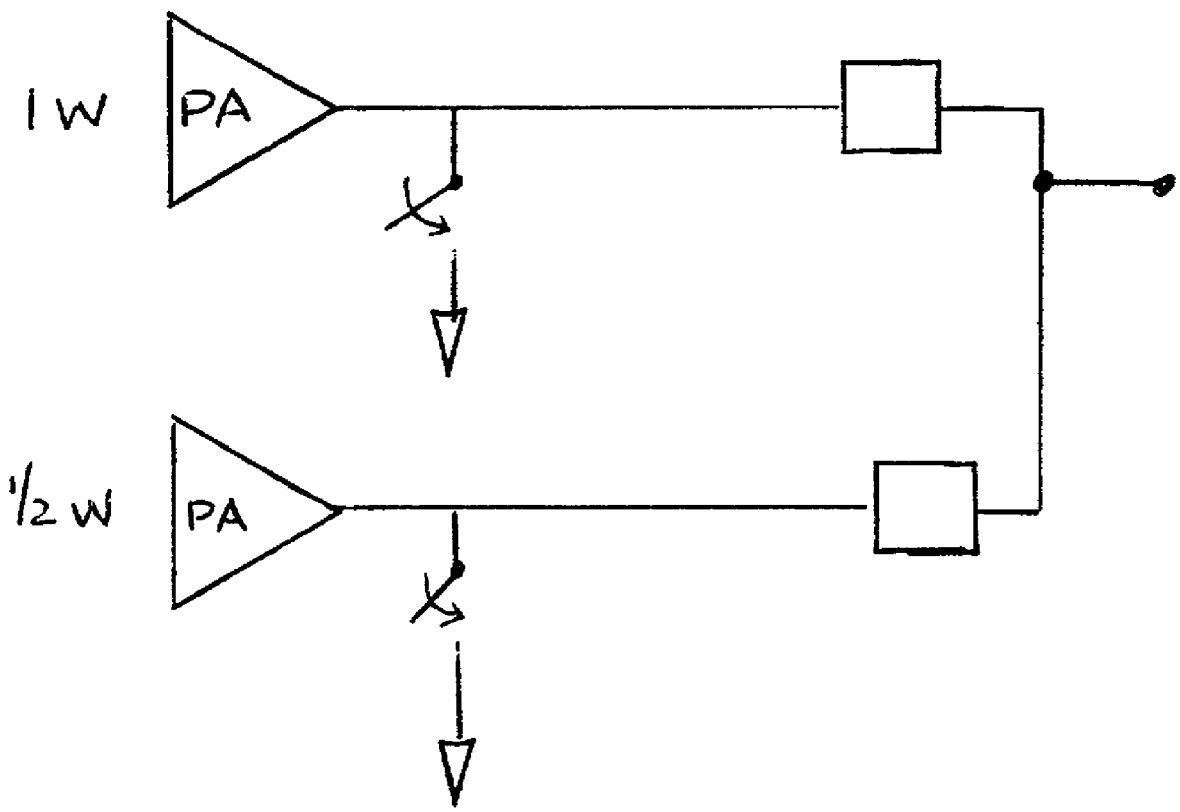
FIG. 10 is a prior art implementation of a switchable power combiner using parallel shunt PA devices.

FIG. 10 is a prior art implementation of switchable power combiner using parallel devices. Each of a dual PA arrangement includes a shunt switch that grounds the unused PA output. This basic idea can be extended to transmit/receive switches.

Figure 11:
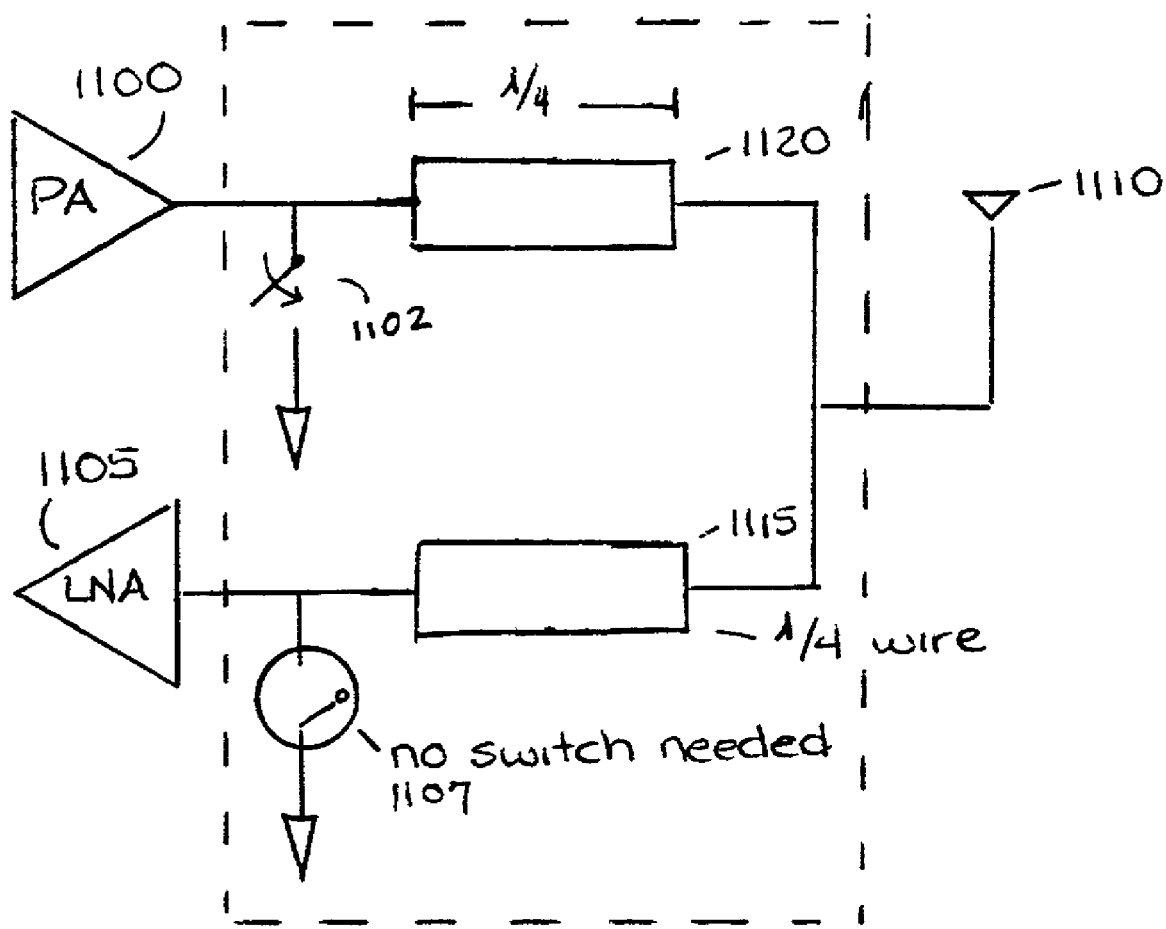
FIG. 11 is a block diagram of a transmitter PA and a receiving LNA operating with shunt switches in conjunction with a single antenna according to an embodiment of the present invention.

The present invention leverages from the switchable power combiner in FIG. 10 to provide an improved transmit/receive switch arrangement for associating a PA or a LNA to an antenna. FIG. 11 is a block diagram of a transmitter PA 1100 and a receiving LNA 1105 operating without external switches in conjunction with a single antenna 1110. Each of the components are coupled to a ¼ wavelength wires or equivalent networks 1115 and 1120. And, no grounding switch for the LNA 1105 is needed.

FIG. 11 exploits a property of ¼ wavelength wires that a short circuit on one end of the wire appears as an open circuit at the other end. In the circuit shown, during receive, the shunt switch 1102 on the transmit (PA) side is shorted to ground. This causes the other end of wire 1120 to appear as an open circuit, and thus the received signal is coupled from the antenna 1110 to the LNA 1105 with a minimum of loss onto the transmit circuitry. Thus, the shunt switch 1102 is opened during transmit and closed during receiving. The shunt switch 1102 is operated via circuitry and/or programming.

The same principle applies during transmit mode, when signals coupled from the PA 1100 to the antenna 1110 with a minimum of loss into the receive circuitry. In concept, this is accomplished by placing a shorted switch 1107 on the LNA side of wire 1115. In practice, the present inventors have found that the loss of signal power during transmit is minimal, and may not require switch 1107 at the LNA input. This is due to the relatively small input capacitance of the LNA (in this implementation). Also, since the presence of a switch at the LNA input would degrade the receiver performance (even when the switch is open), the preferred implementation of FIG. 11 uses only the single shunt switch 1102 at the output of the PA 1110.

Individuals skilled in the art of RF design can replace the ¼ wavelength lines with equivalent lump element circuits or matching networks.

Figure 12:
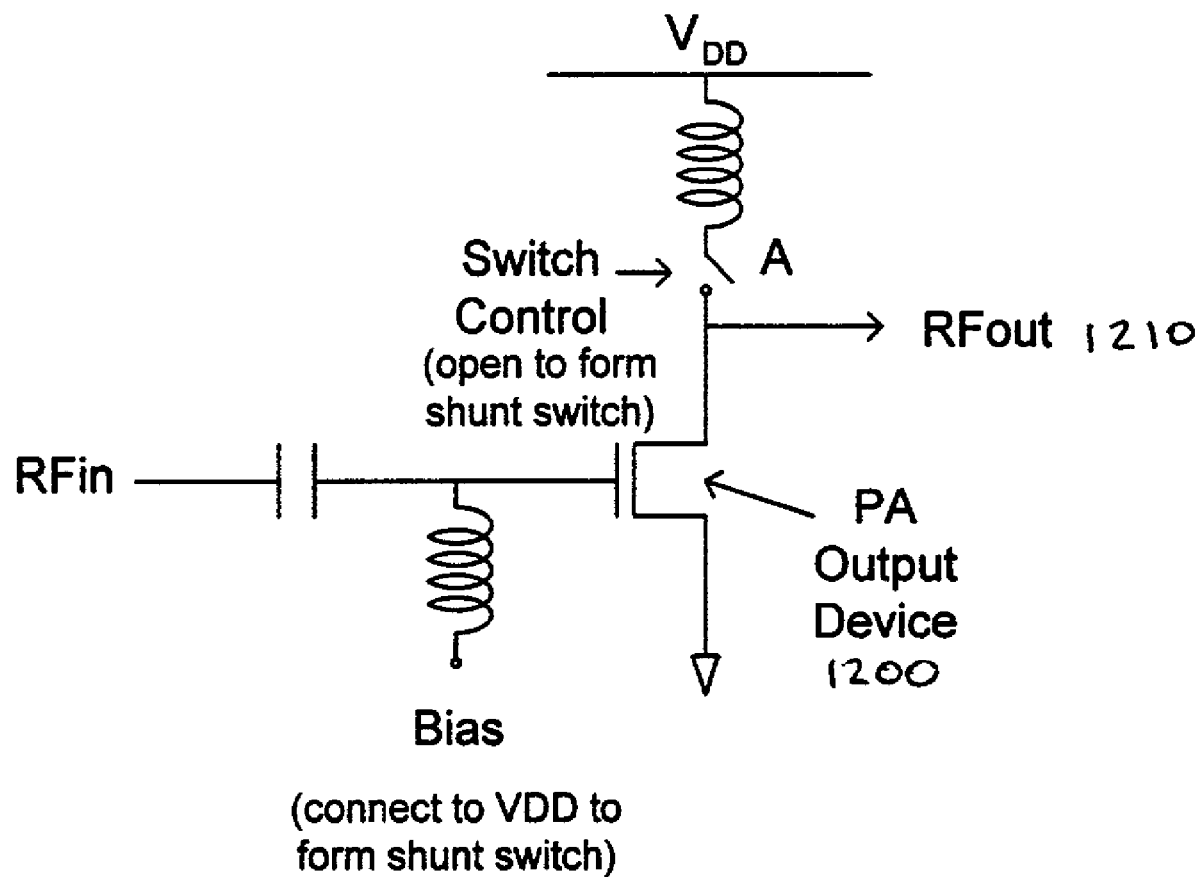
FIG. 12 is an example implementation of a PA with a built-in shunt switch according to an embodiment of the present invention.

FIG. 12 is an example implementation of a PA with a built-in shunt switch according to an embodiment of the present invention. With reference to FIG. 12, the following operations are performed:

A) During Transmit, the PA output device delivers power to the antenna Rfout 1210. Switch (A) is closed so that the DC current is provided to the PA output device 1200. Bias is set at a DC voltage appropriate for amplifying the input RF signal.

B) During Receive, the shunt switch is active, and no DC power should be consumed. Switch (A) is open to disconnect DC power from the PA output device. Bias is connected to VDD so that the PA output device 1200 forms a shunt-switch to ground. Note that switch (A) can either be placed between the inductor and PA device 1200 as shown in FIG. 12 or between the inductor and supply VDD.

Although the present invention has been described herein with reference to diversity antennas A and B, any number of antennas may be accommodated by adding additional circuits and/or other hardware as described herein, which will be apparent to the ordinarily skilled artisan based upon review of the present disclosure.

The present invention is intended to be applicable to any range of frequencies and numerous antenna combinations. In one embodiment, an RF front end according to the present invention is configured for IEEE 802.11a wireless communications. In another embodiment, the RF front end is configured for 802.11b wireless communications. In yet another embodiment, diversity antennas are utilized in an 802.11a and 802.11b combined radio device. Either the antennas themselves are dual band antennas, or the one or more of the antennas attached to the RF front end are specifically for 802.11a communications and one or more other of the antennas attached to the RF front end device are specifically for 802.11b communications. Again, however, any combination protocols or broadcast frequencies may be supported by the devices and processes elaborated herein.

In describing preferred embodiments of the present invention illustrated in the drawings, specific terminology (e.g., component values, transistor types, differential design, etc.) is employed for the sake of clarity. However, the present invention is not intended to be limited to the specific terminology so selected, and it is to be understood that each specific element includes all technical and design equivalents which operate in a similar manner. For example, when describing power amplifier and combination of electrical components, including, but not limited to, transistors, resistors, capacitors, etc. may be employed in making that part, and, any other device having an equivalent function or capability, whether or not listed herein, may be substituted therewith. Furthermore, the inventors recognize that newly developed technologies not now known may also be substituted for the described parts and still not depart from the spirit and scope of the present invention. All other described items, including, but not limited to LNAs, Splitters, combiners, switches, and antennas, etc should also be consider in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any one or more processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, setting of switches, (e.g., diversity switches, transmit/receive switches, etc.), setting PA amplification levels, packet testing, signal strength evaluation, software mixing, combining, or other functions to implement any aspect of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An RF front end architecture, comprising:
a set of multiple antenna ports;
multiple power amplifier PA devices configured to feed signals to at least one of the antenna ports;
multiple low noise amplifier LNA devices configured to receive signals from at least one of the antenna ports, wherein each LNA device is paired with one of the PA devices and configured to receive signals from the antenna port to which its paired PA device is configured to feed signals;
a transmit/receive switch coupled between each paired PA and LNA and its corresponding antenna port; and
antenna diversity switches connected to inputs of the PA devices and/or outputs of the LNA devices,
wherein said transmit/receive switch, for each paired PA and LNA, comprises:
a shunt switch that grounds an output of the PA device;
a first ¼ wavelength wire or equivalent network connected to an output of the PA device and the shunt switch at one end and connected to the antenna port at another end; and a second ¼ wavelength wire or equivalent network connected to an input of the LNA device at one end and connected to the antenna port at another end.

2. An RF front end architecture, comprising:
a set of multiple antenna ports;
multiple power amplifier PA devices configured to feed signals to at least one of the antenna ports;
multiple low noise amplifier LNA devices configured to receive signals from at least one of the antenna ports, wherein each LNA device is paired with one of the PA devices and configured to receive signals from the antenna port to which its paired PA device is configured to feed signals;
a transmit/receive switch coupled between each paired PA and LNA and its corresponding antenna port; and
antenna diversity switches connected to inputs of the PA devices and/or outputs of the LNA devices,
wherein said transmit/receive switch, for each paired PA and LNA, comprises:
a shunt switch that grounds an input of the LNA device;
a first ¼ wavelength wire or equivalent network connected to an input of the LNA device and the shunt switch at one end and connected to the antenna port at another end; and
a second ¼ wavelength wire or equivalent network connected to an output of the PA device at one end and connected to the antenna port at another end.

3. An RF front end architecture, comprising:
a set of multiple antenna ports;
multiple power amplifier PA devices configured to feed signals to at least one of the antenna ports;
multiple low noise amplifier LNA devices configured to receive signals from at least one of the antenna ports, wherein each LNA device is paired with one of the PA devices and configured to receive signals from the antenna port to which its paired PA device is configured to feed signals; a transmit/receive switch coupled between each paired PA and LNA and its corresponding antenna port; and
antenna diversity switches connected to inputs of the PA devices and/or outputs of the LNA devices,
wherein said transmit/receive switch, for each paired PA and LNA, comprises:
a first shunt switch that grounds an output of the PA device;
a second shunt switch that grounds an input of the LNA device;
a first ¼ wavelength wire or equivalent network connected to an output of the PA device and the first shunt switch at one end and connected to the antenna port at another end; and
a second ¼ wavelength wire or equivalent network connected to an input of the LNA device and the second shunt switch at one end and connected to the antenna port at another end.

4. An RF front end architecture, comprising:
a set of multiple antenna ports;
multiple power amplifier PA devices configured to feed signals to at least one of the antenna ports;
multiple low noise amplifier LNA devices configured to receive signals from at least one of the antenna ports;
antenna diversity switches connected to inputs of the PA devices and/or outputs of the LNA devices; and
at least two phase shifters each phase shifter coupled to an input of one of the power amplifiers,
wherein each power amplifier is coupled to one of the antenna ports, and each phase shifter is configured to phase shift signals prior to amplification by the power amplifier coupled to the phase shifter.

5. The RF front end architecture according to claim 4, wherein the phase shifted signals are phase shifted such that when amplified by the power amplifiers and broadcast from separate antennas each connected to one of the antenna ports, a predetermined antenna radiation pattern is formed.

6. The RF front end architecture according to claim 5, wherein said phase shifters are programmable, and said RF device further comprises a programming device configured to program an amount of phase shift performed by each phase shifter needed to form the predetermined antenna radiation pattern.

7. The RF front end architecture according to claim 4, wherein said phase shifters are programmable.

8. The RF front end architecture according to claim 7, further comprising:
a controller device coupled to said phase shifters and configured to adjust a phase of signals to be fed to the antenna ports such that a signal broadcast from antennas connected to the antenna ports provide an optimal antenna radiation pattern.

9. The RF front end architecture according to claim 7, further comprising:
a controller device; and
a set of instructions, when loaded into the controller, cause the controller to perform the step of adjusting a phase of signals to be broadcast from each antenna port until a desired radiation pattern is emitted from antennas attached to the antenna ports.

10. An RF front end architecture, comprising:
a set of multiple antenna ports;
multiple power amplifier PA devices configured to feed signals to at least one of the antenna ports;
multiple low noise amplifier LNA devices configured to receive signals from at least one of the antenna ports;
antenna diversity switches connected to inputs of the PA devices and/or outputs of the LNA devices; and
at least two phase shifters, each LNA device having an output coupled to an input of one of the phase shifters; and
a signal combiner coupled to an output of each of the phase shifters,
wherein each phase shifter is configured to phase shift signals received by each LNA device so that they can be combined in phase by the signal combiner.

11. The RF front end architecture according to claim 10, wherein said phase shifters are programmable.

12. The RF front end architecture according to claim 11, further comprising:
a controller device coupled to said phase shifters and configured to adjust a phase of signals received from the antenna ports and set an amount of phase shift in each of the phase shifters such that the signals are combined in optimal phase.

13. The RF front end architecture according to claim 11, further comprising:
a controller device; and
a set of instructions, when loaded into the controller, cause the controller to perform the step of adjusting a phase of signals received on each antenna port until a desired gain is achieved by antennas attached to the antenna ports.

14. An RF front end architecture, comprising:
a set of multiple antenna ports;
multiple power amplifier PA devices configured to feed signals to at least one of the antenna ports;

multiple low noise amplifier LNA devices configured to receive signals from at least one of the antenna ports;
antenna diversity switches connected to inputs of the PA devices and/or outputs of the LNA devices; and
at least one transmit/receive switch coupled between the PA and the LNA devices and the antenna ports,
wherein each transmit/receive switch-T- comprises:
a shunt switch that grounds an output of a PA device;
a first ¼ wavelength wire or equivalent network connected to an output of the shunt switch grounded PA device and the shunt switch at one end and connected to an antenna port at another end; and
a second ¼ wavelength wire or equivalent network connected to an input of an LNA device at one end and connected to the switched antenna port at another end.

15. An RF front end architecture, comprising:
a set of multiple antenna ports;
multiple power amplifier PA devices configured to feed signals to at least one of the antenna ports;
multiple low noise amplifier LNA devices configured to receive signals from at least one of the antenna ports;
antenna diversity switches connected to inputs of the PA devices and/or outputs of the LNA devices; and
at least one transmit/receive switch coupled between the PA and the LNA devices and the antenna ports,
wherein said transmit/receive switch, for each paired PA and LNA, comprises:
a shunt switch that grounds an input of the LNA device;
a first ¼ wavelength wire or equivalent network connected to an input of the LNA device and the shunt switch at one end and connected to the antenna port at another end; and
a second ¼ wavelength wire or equivalent network connected to an output of the PA device at one end and connected to the antenna port at another end.

16. An RF front end architecture, comprising:
a set of multiple antenna ports;
multiple power amplifier PA devices configured to feed signals to at least one of the antenna ports;
multiple low noise amplifier LNA devices configured to receive signals from at least one of the antenna ports;
antenna diversity switches connected to inputs of the PA devices and/or outputs of the LNA devices; and
at least one transmit/receive switch coupled between the PA and the LNA devices and the antenna ports,
wherein said transmit/receive switch, for each paired PA and LNA, comprises:
a first shunt switch that grounds an output of the PA device;
a second shunt switch that grounds an input of the LNA device;
a first ¼ wavelength wire or equivalent network connected to an output of the PA device and the first shunt switch at one end and connected to the antenna port at another end; and
a second ¼ wavelength wire or equivalent network connected to an input of the LNA device and the second shunt switch at one end and connected to the antenna port at another end.

17. An RF front end, comprising:
a set of at least two antenna ports;
at least two low noise amplifier (LNA) devices, each LNA device configured to receive signals from at least one of the antenna ports; and
a signal combiner coupled to each of the LNA devices and configured to combine signals from outputs of each LNA device; and
at least two phase shifters, each respective phase shifter having an input coupled to at least one output of the at least two low noise amplifiers and configured to phase shift a signal output from the LNA devices coupled to the respective phase shifter prior to combination by the signal combiner.

18. A method of receiving RF signals, comprising the steps of:
determining at least one antenna better suited for receiving RF signals;
switching a signal receiving line to direct outputs of LNAs; and
directly connecting each LNA to only one of the better suited antennas via a corresponding transmit/receive switch.

19. The method according to claim 18, wherein the transmit/receive switch comprises an on-chip shunt switch.

20. The method according to claim 18, wherein:
said method is embodied in a set of computer instructions stored on a computer readable media;
said computer instructions, when loaded into a computer, cause the computer to perform the steps of said method.

21. The method according to claim 20, wherein said computer instruction are compiled computer instructions stored as an executable program on said computer readable media.

22. The method according to claim 18, wherein said method is embodied in a set of computer readable instructions stored in an electronic signal.

23. The method according to claim 18, wherein: said method is implemented in a digital baseband ASIC.

24. A method of receiving RF signals, comprising the steps of:
determining at least one antenna better suited for receiving RF signals; and
switching a signal receiving line to outputs of LNAs each only coupled to one of the best suited antennas,
wherein:
said step of determining comprises determining at least two antennas better suited for receiving RF signals; and
the method further comprises the steps of,
phase shifting each of the RF signals received by each of the best suited antennas, and
combining the phase shifted RF signals to produce a single RF signal switched to the signal receiving line.

25. The method according to claim 24, wherein said step of phase shifting comprises phase shifting each of the received RF signals so that they are combined in optimal phase.

26. An RF device, comprising:
means for determining at least one antenna better suited for receiving RF signals;
means for switching a signal receiving line to direct outputs of LNAs; and
means for directly connecting each LNA to only one of the better suited antennas via a corresponding transmit/receive switch.

27. An RF front-end device, comprising:
a diversity switch having multiple outputs;
multiple antenna ports;
multiple Power Amplifier (PA) devices, each PA having an input connected to one of the individual outputs of the diversity switch, and an output exclusively connected to one of the antenna ports, wherein each PA input is only connected to one of the outputs of the diversity switch, each LNA output is only connected only to one of the inputs of the diversity switch, and each antenna port is connected to one PA output and one LNA input; and at least one transmit/receive switch, each transmit/receive switch connected to the output of one of the PA devices and configured to connect/disconnect the PA device from its antenna port, wherein each transmit/receive switch comprises:

a first set of ¼ wavelength wires or equivalent networks each connected to an output of one of the PA devices;

a second set of ¼ wavelength wires or equivalent networks each connected to an output of one of the PA devices; and at least one shunt switch configured to ground at least one of the PA and LNA devices.

28. An RF front-end device, comprising:

a diversity switch having multiple outputs;

multiple antenna ports;

multiple Power Amplifier (PA) devices, each PA having, an input connected to one of the individual outputs of the diversity switch, and an output exclusively connected to one of the antenna ports, wherein each PA input is only connected to one of the outputs of the diversity switch, each LNA output is only connected only to one of the inputs of the diversity switch, and each antenna port is connected to one PA output and one LNA input; and at least one transmit/receive switch, each transmit receive switch connected only to the input of one of the LNA devices and configured to disconnect/connect the LNA device from its antenna port, wherein each transmit/receive switch comprises a set of ¼ wavelength wires or equivalent networks and at least one shunt switch.

29. An RF front end architecture, comprising:

a set of multiple antenna ports;

at least one power amplifier PA device configured to feed signals to at least one of the antenna ports;

at least two low noise amplifier LNA devices each configured to receive signals from one of the antenna ports, wherein said at least two LNA devices are part of an IC device and said the at least one PA device is external to the IC device;

an antenna diversity switch connected to inputs of the at least one PA device and outputs of the LNA devices; and at least two 3-way transmit/receive switches, each transmit/receive switch coupled between one of the antenna ports, the external PA, and one of the LNA devices.

30. The RF front end architecture according to claim 29, wherein each transmit/receive switch, comprises:

a shunt switch that grounds an output of the PA device;

a first ¼ wavelength wire or equivalent network connected to an output of the PA device and the shunt switch at one end and connected to the antenna port at another end; and a second ¼ wavelength wire or equivalent network connected to an input of the LNA device at one end and connected to the antenna port at another end.

31. The RF front end architecture according to claim 29, wherein said transmit/receive switch, for each paired PA and LNA, comprises:

a shunt switch that grounds an input of the LNA device;

a first ¼ wavelength wire or equivalent network connected to an input of the LNA device and the shunt switch at one end and connected to the antenna port at another end; and a second ¼ wavelength wire or equivalent network connected to an output of the PA device at one end and connected to the antenna port at another end.

32. The RF front end architecture according to claim 29, wherein said transmit/receive switch, for each paired PA and LNA, comprises:

a first shunt switch that grounds an output of the PA device;

a second shunt switch that grounds an input of the LNA device;

a first ¼ wavelength wire or equivalent network connected to an output of the PA device and the first shunt switch at one end and connected to the antenna port at another end; and a second ¼ wavelength wire or equivalent network connected to an input of the LNA device and the second shunt switch at one end and connected to the antenna port at another end.

33. A method of transmitting RF signals, comprising the steps of:

preparing RF signals for transmission;

selecting an antenna best suited for transmitting the prepared RF signals from a set of at least two antennas; and using diversity switches, feeding the prepared RF signals to a power amplifier coupled to the selected antenna, wherein each antenna is individually coupled to only one power amplifier;

selecting a set of antennas for transmitting the prepared RF signals on the beam;

splitting the prepared RF signals so that one signal has been split for each selected antenna; and phase shifting the split signals as required so that when transmitted by the antennas, a desired radiation pattern is formed.

* * * * *